United States Patent
Dittler et al.

(10) Patent No.: US 6,755,016 B2
(45) Date of Patent: Jun. 29, 2004

(54) DIESEL ENGINE PARTICLE FILTER

(75) Inventors: Achim Dittler, Stuttgart (DE); Gunther Wenninger, Stuttgart (DE); Georg Huthwohl, Soest (DE); Peter Neumann, Menden (DE); Eberhard Schmidt, Wuppertal (DE)

(73) Assignee: PURem Abgassysteme GmbH & Co., KG (DE)

( * ) Notice: Subject to any disclaimer, the term of this patent is extended or adjusted under 35 U.S.C. 154(b) by 0 days.

(21) Appl. No.: 10/288,776

(22) Filed: Nov. 6, 2002

(65) Prior Publication Data

US 2003/0101717 A1 Jun. 5, 2003

(30) Foreign Application Priority Data

Nov. 6, 2001 (DE) .................................... 201 17 862 U

(51) Int. Cl.[7] .................................................. F01N 3/00
(52) U.S. Cl. .......................... 60/297; 60/311; 55/300; 55/302; 55/522; 55/524; 55/DIG. 30
(58) Field of Search ............. 60/297, 311; 55/DIG. 28, 55/DIG. 30, 522, 523, 524, 300, 302, 304; 110/342, 343; 422/171, 177

(56) References Cited

U.S. PATENT DOCUMENTS

| | | | | |
|---|---|---|---|---|
| 4,324,574 A | * | 4/1982 | Fagan .......................... 55/487 |
| 4,600,414 A | * | 7/1986 | Metcalfe et al. ............... 55/524 |
| 4,706,579 A | * | 11/1987 | Merrell ........................ 110/343 |
| 4,728,503 A | * | 3/1988 | Iida et al. ............... 55/DIG. 30 |
| 4,746,341 A | * | 5/1988 | Komoda ....................... 55/524 |
| 4,968,467 A | * | 11/1990 | Zievers .......................... 55/523 |
| 5,001,994 A | * | 3/1991 | Morimoto et al. ........... 110/342 |
| 5,250,090 A | * | 10/1993 | Vandervort et al. ............ 55/523 |
| 5,518,513 A | * | 5/1996 | Iwanaga et al. ............... 55/302 |
| 5,605,553 A | * | 2/1997 | Connolly et al. .............. 55/487 |
| 5,902,363 A | * | 5/1999 | Connolly et al. .............. 55/523 |
| 6,027,796 A | | 2/2000 | Kondoh et al. |
| 6,180,054 B1 | * | 1/2001 | Connolly et al. .............. 55/523 |

FOREIGN PATENT DOCUMENTS

| | | | |
|---|---|---|---|
| DE | 2 206 675 | | 8/1972 |
| DE | 38 22 157 A1 | | 1/1990 |
| DE | 41 34 949 A1 | | 4/1993 |
| DE | 43 13 132 A1 | | 10/1994 |
| DE | 196 29 015 A1 | | 1/1998 |
| DE | 198 36 859 A1 | | 2/2000 |
| DE | 199 59 955 A1 | | 6/2000 |
| JP | 07008729 | | 1/1995 |
| JP | 08028247 | | 1/1996 |
| JP | 9-220423 | * | 8/1997 |

* cited by examiner

*Primary Examiner*—Thomas Denion
*Assistant Examiner*—Tu M. Nguyen
(74) *Attorney, Agent, or Firm*—Rick Martin; Patent Law Offices of Rick Martin, PC

(57) ABSTRACT

A diesel particle filter for lowering the emission of particles contained in the exhaust gas of a Diesel engine, is disclosed with the impaction surface of the diesel particle filter is developed such that binding forces of the ash to filter is lowered. Therefore, the adhesion of noncombustible ash particles occurs, if at all, on the impaction surface of the diesel particle filter at only with such binding forces that more the ash particles can be removed from this surface of the diesel particle filter with a fluid and/or by vibrational effects.

5 Claims, 1 Drawing Sheet

DIESEL ENGINE PARTICLE FILTER

CROSS REFERENCE APPLICATIONS

This application claims priority from German application no. 201 17 862.1 filed Nov. 6, 2001.

FIELD OF INVENTION

The present invention relates to a diesel particle filter for lowering the emission of particles contained in the exhaust gas of a diesel engine. The invention further relates to a diesel engine with an exhaust gas system and a diesel particle filter disposed in the exhaust gas system.

BACKGROUND OF THE INVENTION

Diesel particle filters are applied in exhaust gas systems of diesel engines to retain the soot particles contained in the exhaust gas. The soot particles contained in the exhaust gas flow during operation of the diesel engine accumulate on the impaction-side of the diesel particle filter. In order to prevent the increase of counter pressure in the exhaust gas, the accumulated soot is removed by oxidation within the scope of a combustion process at regular time intervals or as a function of the exhaust gas counter pressure. In this way a diesel particle filter can be regenerated.

However, among the soot particles deposited on the surface of the diesel particle filter are some which are not combustible and which remain as noncombustible, inorganic components during and after such filter regeneration. Within the scope of the following explanations these components are referred to as ash. The ash is retained on the surface or in the porous filter body.

Over the operating life of the diesel engine and/or its diesel particle filters increasingly more ash accumulates on the impaction-side surface of the diesel particle filter. This causes an undesirable increase of the exhaust gas counter pressure. For this reason the diesel particle filter must be freed of these ash deposits at regular intervals. For example, DE 41 34 949 C2 or also DE 199 59 955 A1 propose for cleaning such a diesel particle filter to provide access to the diesel particle filter in the exhaust gas system both in front of and behind the filter. Directions used are in referenced to the direction of flow of the exhaust gas. Through the access a fluid can be introduced into the exhaust gas system to flow through the diesel particle filter counter to the direction of through flow of the exhaust gas and to be drawn off again through the opening located at the impaction-side in front of the diesel particle filter. Through this cleaning stream the ash is said to become detached from the impaction-side surface of the diesel particle filter and be taken out of the exhaust gas system. The fluid employed can be a liquid or gaseous phased substance.

Within the cited prior art it is also proposed that the diesel particle filter is taken out of the exhaust gas system and subsequently be freed of the ash deposits in corresponding cleaning baths. However, problematic in the known methods is that the cleaning of the diesel particle filter is insufficient and incomplete. As a rule, ash accumulations remain in the form of patches.

Building on this discussed prior art, the present invention discloses a diesel particle filter that utilizes conventional cleaning methods and obtains a better cleaning of a diesel particle filter of ash deposits.

In the present invention the impaction surface is developed such that the surface has a low binding force to the ash particles. This results in the adhesion of ash particles on this surface of the diesel particle filter occurs, at most, only with such binding forces that the ash particles can be removed from this surface of the diesel particle filter with a fluid and/or through vibrational action.

SUMMARY OF THE INVENTION

The primary aspect of the present invention is to provide a diesel particle filter which has an impact surface which allows for the easy cleaning of ash off the impact surface of the filter.

Other aspects of this invention will appear from the following description and appended claims, reference being made to the accompanying drawings forming a part of this specification wherein like reference characters designate corresponding parts in the several views.

In the diesel particle filter of the present invention at least its impaction-side surface is developed such that ash particles are capable of adhesion to its surface only with such binding forces—if at all—that the ash particles can be readily removed again from the diesel particle filter by blowing a fluid in the counter flow direction or other known removal methods.

Figure 1:
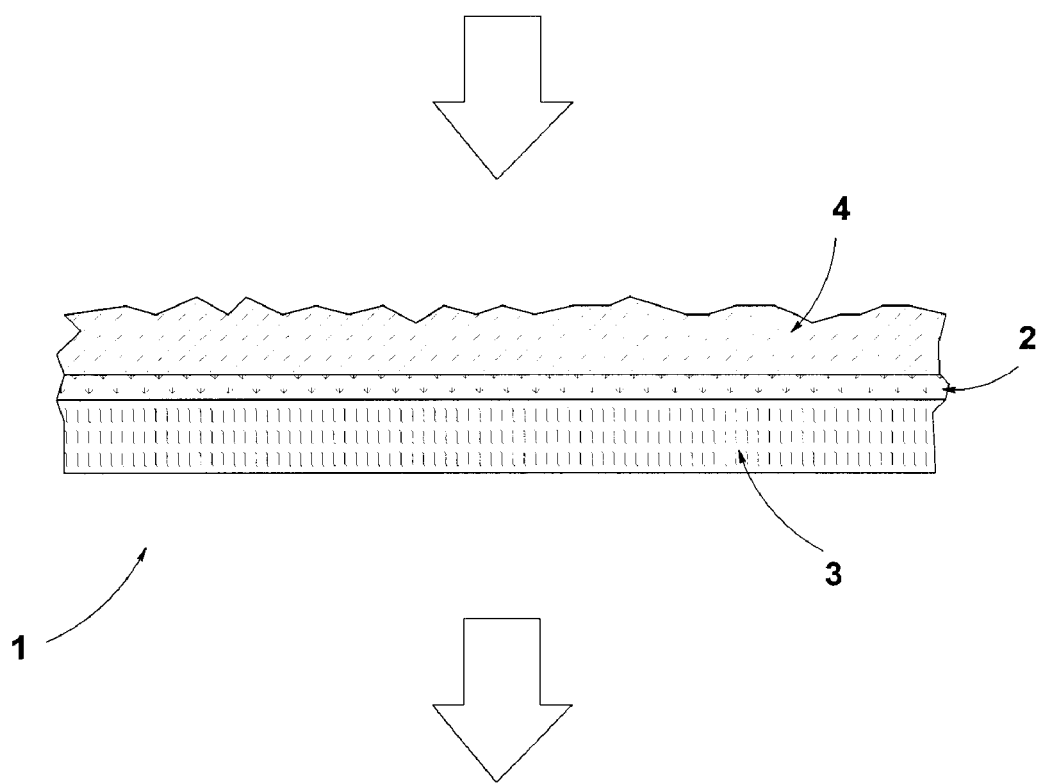
FIG. 1 is a cross sectional view of a Diesel particle filter 1.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Referring first to FIG. 1, a diesel particle filter 1 is disposed in the exhaust gas flow of a diesel engine in a manner not further represented. Arrows identify the direction of flow of the exhaust gas. The impaction-side surface of the diesel particle filter 1 is coated with a separating layer 2. The separating layer 2 is porous in order for the exhaust gas to flow through the layer 2 and into filter plates 3 of diesel particle filter 1. FIG. 1 depicts the diesel particle filter 1 with an ash layer 4 deposited on the separating layer 2 before the cleaning of the filter 1.

The separating layer 2 reduces the binding forces between the ash 4 and the filter plates 3 of the diesel particle filter 1, compared to the binding forces that would occur if the ash layer were to adhere directly on the surface of the filter plate 3. The binding forces are lowered far enough that the separating layer 2 and the adjacent ash layer 4 can readily be detached from the filter plates 3 by applying a fluid or other known removal method. The diesel particle filter 1 can therefore be cleaned with the conventional counter flow fluid technique. FIG. 1 also shows clearly that when the separating layer 2 is decomposed through the use of a fluid, for example a gas, the ash layer 4 is readily removed with the separating layer 2 from the diesel particle filter 1 or its filter plates 3.

Binding the ash particles accumulating on the impaction-side surface of the filter plates 3 with one another such that the detachment of the ash layer 4 is facilitated can also be used to carry out the cleaning of the filter surface of the diesel particle filter. The connection of the ash particles with one another can take place by baking, sintering or conglomeration by adhesion of the ash particles. For example adhesive agents can be applied as a vapor onto the ash layer or the filter with the ash layer can be immersed into a thin-bodied curing composition. Through additional thermal treatment curing of an ash layer impregnated with a binding agent the adhesive agent can be improved and accordingly detachment from the filter can be facilitated. Sintering of the ash particles to form an ash layer can take place in a process completed externally.

In order to further improve the cleaning of the filter an additive can be added to the fuel, to the motor oil, the intake air and/or to the exhaust gas flow to further reduce the adhesion of the ash particles to one another and/or to the impaction-side surface of the diesel particle filter.

Such an additive can, for example, be injected via a device associated with the exhaust gas system. The additive is turbulently mixed with the soot particles in the exhaust gas flow and either forms a chemical compound with the soot particles or is deposited together with these and which releases its adhesion-reducing properties during soot combustion.

The separating layer can be made of oxides of Si, Mg, Al, Ca and/or Fe, a carbonate, preferably Ca, or a sulphate or a nitrate. These substances may be applied individually or as a combination of one or more substances.

A low binding surface can be developed as a separating layer or separating medium in order to attain adhesion reduction or binding force-reduction due to a material applied. Other methods to achieve adhesion reduction are by the specific nano-structures of such a separating layer and/or the filter surface itself. Adhesion reducing separating layers can be applied in different manner on the impaction-side surface of the diesel particle filter, for example the application can take place by deposition out of a solution or a suspension. This layer can also be applied with the aid of an aerosol or also by a sol-gel method.

In a further embodiment of the invention the impaction-side surface of the diesel particle filter can be smoothed by a smoothing process to significantly reduce the effective surface on which ash particles can adhere. This smooth or smoothed surface can additionally be coated with a binding force-reducing layer.

In a further embodiment of the invention the impaction-side surface of the diesel particle filter can be coated with a separating layer, whose chemical binding properties can be affected. Such an action onto the chemical binding properties of such a layer can take place through a supplied fluid by which the layer applied onto the diesel particle filter is broken down and removed together with the ash accumulated thereon. When employing such a diesel particle filter, the broken down layer must be applied anew after such a cleaning. Therefore the applied layer functions as a separating layer within the original meaning of the word.

According to a further embodiment of the invention the removal of the ash particles through mechanical vibration effects is provided, which is possible by disposing an ultrasound head on the diesel particle filter, for example.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A particle filter of use in a diesel engine for lowering the emission of particles contained in the exhaust gas of the diesel engine, said particle filter comprising:

an impaction side surface and an exhaust side surface;

a separating medium removably applied to the impaction-side surface;

the separating medium functioning to lower the adhesion of ash particles to at least one of each other and the impaction-side surface of the particle filter; and said separating medium being removable from the particle filter by effect of a fluid.

2. The diesel particle filter as claimed in claim 1, wherein the fluid is a liquid.

3. The diesel particle filter as claimed in one of claims 1 or 2, wherein the separating medium is applied by means of an additive being added to one or more of a fuel, a motor oil, an intake air and an exhaust gas flow.

4. The diesel particle filter as claimed in one of claims 1 or 2, wherein the separating medium is a layer.

5. The diesel particle filter as claimed in claim 4, wherein the removal of the separating layer comprises a breakdown of the layer.

* * * * *